United States Patent [19]
Watanabe

[11] Patent Number: 5,247,585
[45] Date of Patent: Sep. 21, 1993

[54] OBJECT RECOGNITION DEVICE

[76] Inventor: Masaharu Watanabe, No. 2 Tokiwa-cho 1-chome, Naka-ku, Yokahama-shi, Kanagawa, Japan

[21] Appl. No.: 444,352

[22] Filed: Dec. 1, 1989

[30] Foreign Application Priority Data

Dec. 28, 1988 [JP] Japan .................................. 63-332650
May 11, 1989 [JP] Japan .................................. 1-117662

[51] Int. Cl.$^5$ .............................................. G06K 9/00
[52] U.S. Cl. .......................................... 382/19; 382/8; 382/48; 358/106; 358/101
[58] Field of Search ........................ 382/19, 30, 34, 35, 382/48, 8; 358/106, 101; 356/237

[56] References Cited

U.S. PATENT DOCUMENTS

| | | | |
|---|---|---|---|
| 4,479,145 | 10/1984 | Azuma et al. ......................... | 382/48 |
| 4,579,455 | 4/1986 | Levy et al. ............................ | 358/106 |
| 4,805,123 | 2/1989 | Specht et al. ......................... | 382/48 |
| 4,860,371 | 8/1989 | Matsuyama et al. .................. | 382/8 |
| 4,876,727 | 10/1989 | Maurer et al. ........................ | 382/34 |
| 4,896,278 | 1/1990 | Grove .................................. | 358/106 |
| 4,982,439 | 1/1991 | Castelaz .............................. | 382/30 |

Primary Examiner—Michael T. Razavi
Assistant Examiner—Yon Jung
Attorney, Agent, or Firm—Sughrue, Mion, Zinn, Macpeak and Seas

[57] ABSTRACT

In an object recognition device for judging the normality of an object to be recognized, a monitor region including a plurality of monitor points and being represented by one of the monitor points is superimposed of an image produced by video signals obtained from the object. Additionally, the variation of luminance information obtained from the monitor region with respect to reference information is monitored. In a case where the position of the monitor region on the video image of the object becomes unsuitable for normality determination, a correction range is set at and around the monitor point and the setting of the monitor region is updated to one of a plurality of the monitor points having luminance information obtained when the monitor region is moved to one of the plurality of monitor points contained in the correction range, on which the judgement of normality is facilitated.

13 Claims, 15 Drawing Sheets

OBJECT RECOGNITION DEVICE

BACKGROUND OF THE INVENTION

The present invention relates to a pattern recognition device and, particularly, to such device suitable for use in detecting an object and/or defects thereof to be recognized on the basis of video signals corresponding to an image of the object obtained by a video camera.

In an example of a conventional pattern recognition device disclosed in Japanese Patent Application Laid-Open No. 60-39581, a detection of abnormal operation of an injection mold machine in its injection molding cycle or a test of printed circuit boards during manufacturing steps thereof is performed on a video image of a metal mold and its periphery or a printed circuit board itself on such as a display screen PIC shown in FIG. 10 of this application. That is, the detection or test is performed on the basis of a decision of whether or not a predetermined variation occurs in the video signal.

In such a conventional system, each of a plurality of monitor regions Kj having common shape and size and including a plurality of monitor points is set with respect to a predetermined one (Pj) of the monitor points and superimposed on an image of the object on the PIC screen and monitor information concerning the luminance of the monitor region Kj is obtained every process cycle by integrating video signal portions obtained at the monitor points, where j is a positive integer. Then, an abnormality of the monitor region of the object is detected when unexpected variation occurs in the monitor information during each process cycle.

In such a system, when a position of an image on the display screen PIC is changed by any unintended positional deviation of the object with respect to the video camera or any unintended change of an angle of the camera, a position Pj(xj, yj) of the predetermined monitor point Pj with respect to which the monitor region Kj is set is changed, resulting in an error.

As shown in FIG. 11, in the case of testing of a printed circuit board, for example, a video signal VD is obtained by a video camera 2 disposed in a facing relation to a surface of a printed circuit board 1 mounted in a position determined by a field of sight FILD of the video camera. It has been known, however, that it is very difficult to precisely mount a number of printed circuit boards 1 in an area of the field FILD of the video camera 2 without troublesome procedures and, therefore, a parallel positional deviation of the image of the printed circuit boards in any direction within the display screen PIC is unavoidable in practical applications.

In an object recognition device for use in a monitoring device of an injection mold machine, in order to obtain a video image of a movable half 5 of a metal mold and its holder 6 by a video camera 7 having a field of sight FILD when the movable mold half 5, together with the holder 6, is opened with respect to a fixed half 8 of the metal mold and its holder 9, the video camera 7 is mounted on the fixed mold half 8 through a mounting 10 so that it can look down on the movable mold half 5 and its peripheral portion obliquely, as shown in FIG. 12.

In this case, when the mounting position of the movable mold half 5 is slightly deviated or the angle of the video camera 7 is slightly changed from a predetermined set position, a deviation of an image of the movable mold half on the display PIC is unavoidable. In such case, troublesome correction procedures are required to correct deviation.

In order to solve this problem, it may be considered to move each monitor region Kj on the display PIC in parallel in a direction and by a distance corresponding to those of the image deviation, respectively. This procedure is very difficult and the difficulty is amplified when the number of monitor regions is large.

SUMMARY OF THE INVENTION

An object of the present invention is to provide an object recognition device capable of automatically correcting a position of each monitor region set preliminarily on a display screen so that detection information can be obtained with practically acceptable accuracy, when an image on the display screen is deviated from the monitor region.

The above object can be achieved, according to the present invention, by shifting a location of a monitor region to another location which includes a monitor point whose luminance information is suitable to detect an abnormality of an object.

According to a first aspect of the present invention, an object recognition device in which each of a plurality of monitor regions is defined by a predetermined one of the monitor points included in the monitor region and superimposed on a video display image of an object obtained through a video camera. A decision of whether or not the object is normal is performed by monitoring variation of luminance information obtained from the monitor regions. Correction ranges are provided which each cover the predetermined monitor point and a periphery thereof and the monitor region is shifted to another monitor region defined by one of a plurality of monitor points included in the correction range. Luminance information, i.e., luminance change, which is the most drastic and convenient indicator for determining an abnormality is compared with luminance information of other monitor points therein.

According to a second aspect of the present invention, in a case where there are two monitor points in a monitor region in question which have compatible luminance information, the device mentioned above includes means for shifting the monitor region to another monitor region defined by either the first monitor point or the second monitor point which is included in a correction range and which has a peripheral portion whose luminance information is usable to easily determine the normality or abnormality of the monitor region.

Since each monitor region can be shifted to another region defined by one of the monitor points included in a correction range, which has luminance information suitable to determine a normality easily, it is always possible to obtain an optimum recognition result even when there is positional deviation of an image of an object.

BRIEF DESCRIPTION OF THE DRAWINGS

FIG. 21, comprising FIG. 22 comprising

DETAILED DESCRIPTION OF THE PREFERRED EMBODIMENTS

An embodiment of the present invention will be described in detail with reference to the accompanying drawings.

[1] OVERALL CONSTRUCTION OF THE FIRST EMBODIMENT

Figure 1:
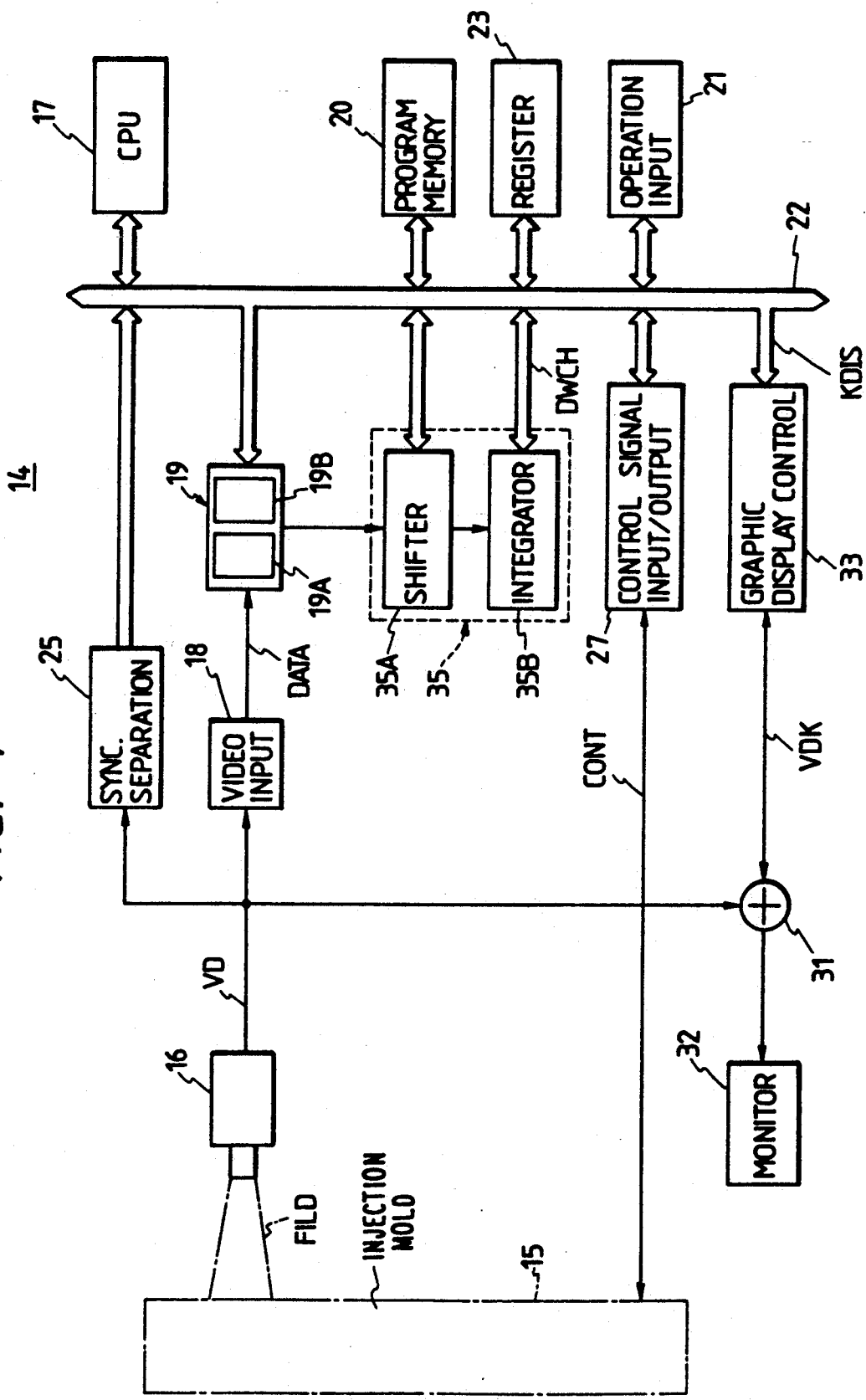
FIG. 1 is a block circuit diagram showing an embodiment of the present invention.
Figure 12:
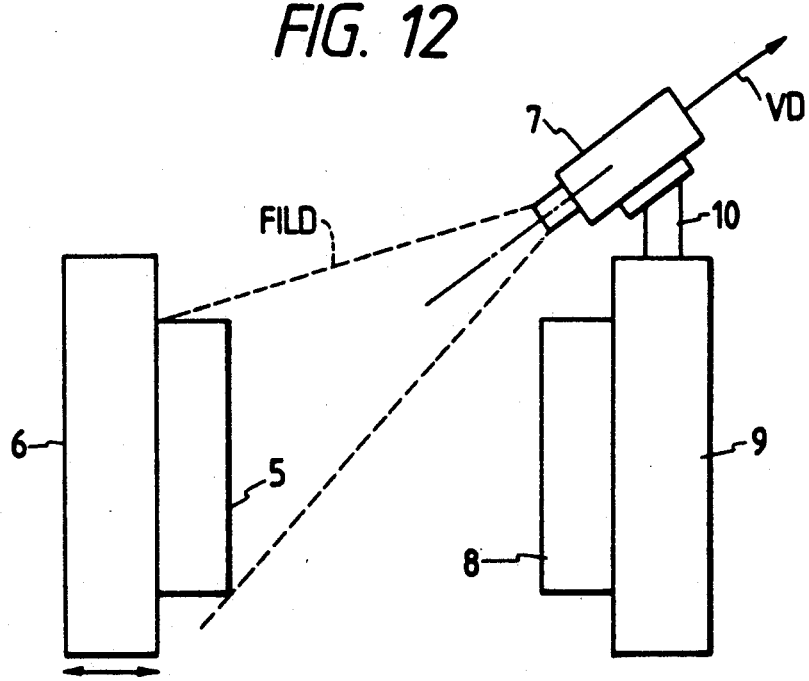

In FIG. 1, the first embodiment of the object recognition device is depicted by a numeral 14 as a whole, which is applied for monitoring of an injection mold machine 15 shown in greater detail in FIG. 12. A video camera 16 provides a video signal VD corresponding to a movable mold half 5 and its periphery within a field of sight FILD thereof. Video signal VD is converted in a video data input circuit 18 comprising an A/D converter into a video data signal DATA and stored in a recognition information memory 19 under control of a CPU 17 according to a synchronizing signal separated from the video data signal VD by a sync separation circuit 25.

The CPU 17 operates according to a program stored in a program memory 20 to store instruction data input by an operator from an operation input portion 21 through a bus 22 on demand and executes data processing of object recognition information on the basis of the data thus stored.

The CPU 17 receives and supplies through a control signal input/output circuit portion 27 a control signal CONT for synchronizing its operation with that of the injection mold machine 15 so that it is possible to process data corresponding to that necessary to execute respective injection mold cycles of the injection mold machine 15.

Figure 3:
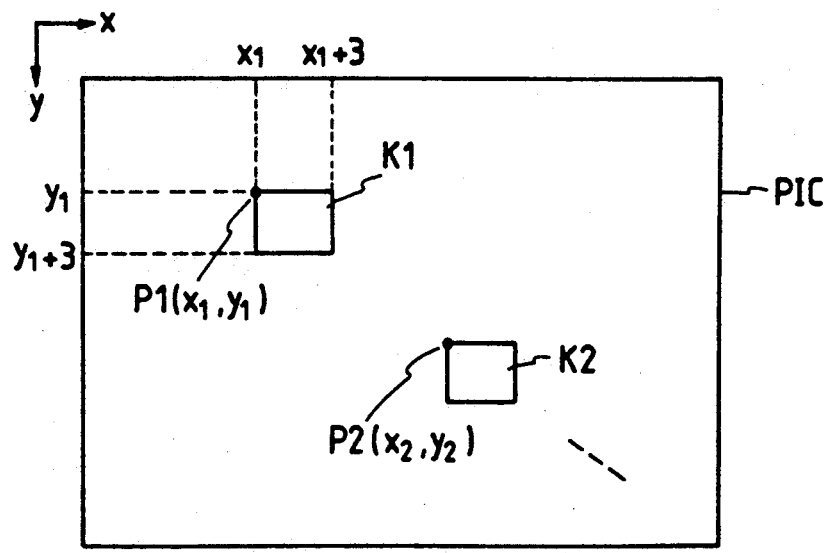
FIG. 3 is an explanatory illustration of a monitor region to be set with respect to a display image of a video signal.

The video signal VD obtained from the video camera 16 is also supplied through a synthesizer circuit portion 31 to a monitor 32 to display on a display screen PIC thereof an image corresponding to a field of sight FILD of the camera as shown in FIG. 3.

At the same time, the CPU 17 supplies monitor region display data KDIS indicating monitor regions Kj to a graphic display control portion 33. Graphic display controller 33 supplies a monitor region display signal VDK to the synthesizing circuit portion 31 to thereby superimpose the monitor regions Kj on the image of the field FILD on the display screen PIC of the monitor 32.

Figure 2:
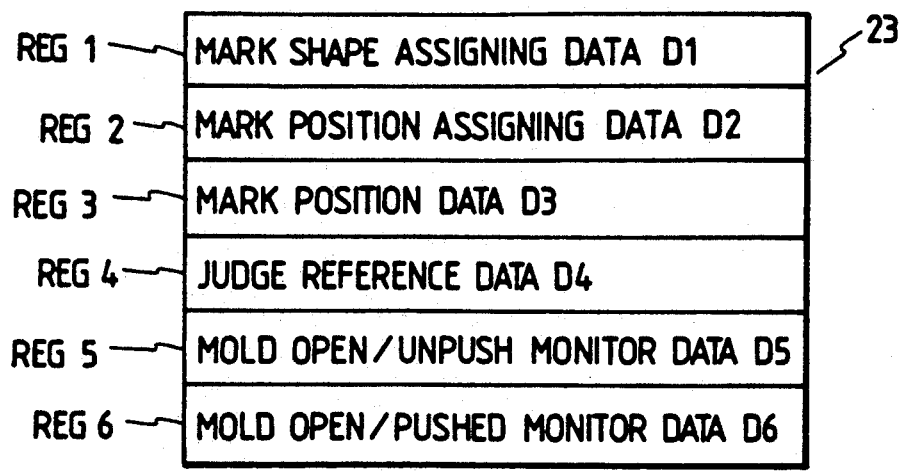
FIG. 2 is a circuit diagram showing details of a register shown in FIG. 1.

In this embodiment, the CPU 17 forms from mark position assigning data D2 and mark shape assigning data D1 to be stored in a mark position assigning data register REG 2 and a mark shape assigning data register REG 1 of a register portion 23 in FIG. 1, details thereof being shown in FIG. 2, respectively. The "mark shape" means a shape and size of the monitor region and the "mark position" means a point representing the monitor region which includes a plurality of monitor points one of which is the mark point.

The CPU 17 further forms data Pj(xj,yj) representing a mark shape and mark positions which are to be included in the respective monitor regions Kj and used as monitor region display data KDIS which is supplied to the graphic display control portion 33. The graphic display control portion 33 produces a monitor region display signal VDK corresponding to an image signal which increases luminance of the display screen PIC locally at a timing corresponding to the monitor region display data KDIS.

In this embodiment, a plurality of mark data different in shape and size from each other are provided as marks for the monitor regions Kj. The operator selects one of them through the operation input portion 21 and the selected mark is stored as the mark shape assigning data D1.

The position of each monitor region Kj is preliminarily input by the operator through the operation input portion 21 as one of the monitor points included therein which is a point on the image of the movable mold half of the metal mold when opened.

The CPU 17 operates to form in its monitor data forming portion 35 luminance information of the thus selected monitor regions Kj on the basis of the video data DATA stored in the recognition information memory 19.

Figure 6:
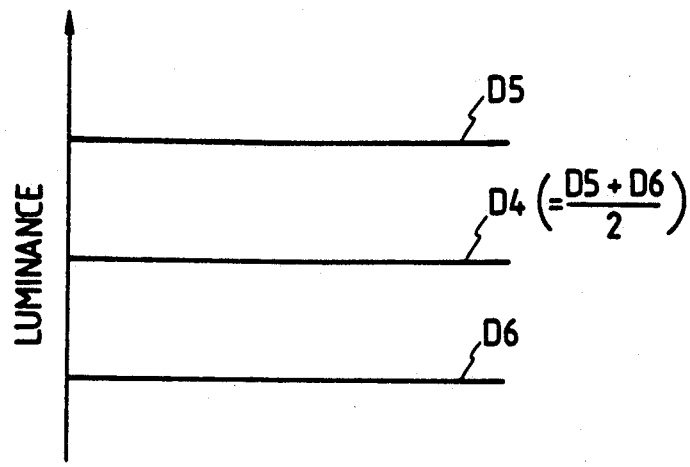
FIG. 6 is a curve as a reference of judgement.

In this embodiment, the recognition information memory 19 includes a first frame memory 19A for storing the video data DATA obtained at a time after the mold of the injection mold machine 15 is opened and prior to a push-out of a molded product from the movable mold half and a second frame memory 19B for storing the video data DATA obtained at a time after the product is pushed out from the movable mold half. The term "push-out" means an operation of the injection mold machine by which a molded product is pushed out from the movable mold half. The CPU 17 integrates, through a shifter 35A and an integrator 35B of the monitor data forming portion 35, the video data DATA stored in the first frame memory 19A and the second frame memory 19B, which correspond to the monitor regions Kj which are determined by the mark position data D3 in the mark position data register REG 3 and the mark shape assigning data D1 in the mark shape assigning data register REG 1 of the register portion 23 (FIG. 2). Resultant, integrated video data, i.e., monitor data DWCH, is stored in a monitor data register REG 5 as monitor data D5 after the mold is opened and before the push-out of the molded product and in a monitor data register REG6 as monitor data D6 after the product is pushed out from the mold, respectively. A relation between the data D5 and D6 is illustrated in FIG. 6 in which reference data D4 which is to be stored in a judge reference data register REG4 is calculated from the data D5 and D6 by the CPU 17 according to the following equation:

$$D4 = (D5 + D6)/2 \qquad (1)$$

The position Pj of each monitor region Kj is selected such that there is a considerable difference in value between the monitor data D5 and D6 obtained when the movable mold half is opened and when the molded product is pushed-out normally from the opened movable mold half of the injection mold 15 by its push-out operation, respectively.

Thus, when the injection mold machine 15 performs the normal push-out operation, the values of the monitor data DWCH at the respective monitor points vary from D5 through D4 to D6, while they are unchanged when the molded product is not pushed out from the movable mold half. Thus, it is possible to determine whether or not the injection mold machine 15 performs the normal push-out operation.

[2] DETERMINATION OF POSITION OF MONITOR REGION

Figure 4:
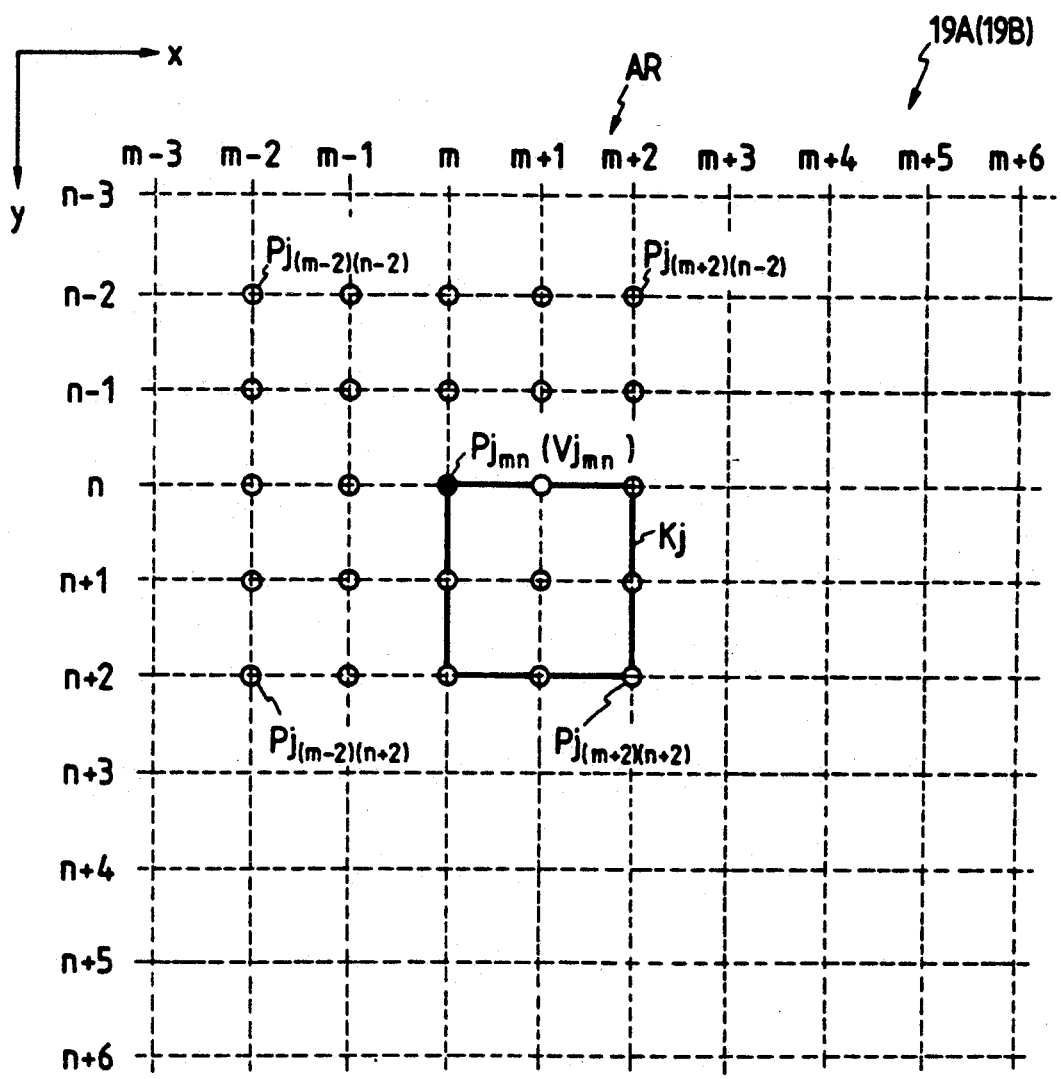
FIG. 4 is an explanatory illustration of a correction range AR for the monitor points Pjxy.

The CPU 17 corrects, according to the operation principle shown in FIG. 4, a positional deviation of the monitor region Kj from the preset position on the display screen, which is caused by a positional deviation of the object itself or a change of the camera angle, so that the position of the monitor region becomes optimum.

As shown in FIG. 4, the first memory 19A of the recognition information memory 19 stores video data DATA in addresses set at cross points of x-direction sampling lines ..., m−2, m−1, m, m+1, m+2, ... and y-direction sampling lines ..., n−2, n−1, n, n+1, n+2, ... This is also applicable to the second frame memory 19B thereof.

An upper left point of the monitor points included in a monitor region Kj is assigned as a sampling point address of the monitor region. Video data obtained at sampling points within the monitor region at a time when the movable mold half is opened and at a time the product is pushed out from the opened mold half are summed or integrated and a result DWCH is stored in the monitor data registers REG 5 and REG 6 as the monitor data D5 and the monitor data D6, respectively, as indicative of luminance of the monitor region Kj, as mentioned previously.

In the case shown in FIG. 4, the monitor region Kj has a square shape whose address is that of a sampling point Pjmn corresponding to a cross point, $x=m$, $y=n$ and whose size is large enough to include $x \times y = 3 \times 3$ samples.

Thus, an integration Vjmn of the video data DATA at 9 addresses, i.e., cross points of the x-direction sampling lines m, m+1 and m+2 and the y-direction sampling lines n, n+1 and n+2, is stored in the monitor registers REG5 and REG6 as the monitor data D5 and the monitor data D6, respectively.

In this case, the point Pjmn which represents the mark position of the monitor region Kj is preliminarily assigned by the operator and stored in the mark position assigning data register REG2, as mentioned previously.

If an image which is identical to that obtained when the operator assigns the monitor position Pjmn of the monitor region Kj of a standard product (master product) is obtained as the video data DATA every injection mold cycle, the CPU 17 can write the integrated value Vjmn in the register portion 23 as proper monitor data D5 and D6, respectively.

Since, however, there may be positional deviation of video data DATA obtained in a practical injection molding cycle with respect to the master image and such positional deviation may be written in the first and second frame memories 19A and 19B as a parallel shift of an image on the display screen in the x and y directions or a rotation of the image, it is necessary to move the monitor point Pjmn of the monitor region Kj to a more suitable monitor point, correspondingly.

In order to realize such a shift of the monitor position, a correction range AR is provided for the monitor region Kj. The correction range AR has a center at the monitor position Pjmn of the monitor region and covers a range defined by $x = \pm 2$ and $y = \pm 2$ around the center position Pjmn, that is, in the case shown in FIG. 4, it covers monitor points corresponding to cross points of x lines m−2, m−1, m, m+1 and m+2 and y lines n−2, n−1, n, n+1 and n+2. Integrated luminance data values Vjmn of the master product when the address of the monitor region Kj is moved to the respective monitor points Pjmn included in the correction range AR are derived from the first and second frame memories 19A and 19B. Then, one of the monitor points having the largest absolute value of difference from a value of a corresponding monitor point of the master product derived from the frame memories 19A and 19B is determined as the optimum monitor point for the monitor region Kj.

That is, in FIG. 4, when the monitor region Kj is moved from the monitor point Pjmn to a monitor point Pjxy within the correction range AR, a luminance value $Vj_Axy$ ($x = m−2, m−1, ..., m+2, y = n−2, n−1, ... n+2$) which is an integration of the 9 monitor points in the monitor region Kj is obtained from the data DATA of the first frame memory 19A and an integration value $Vj_Bxy$ ($x = m−2, m−1, ..., m+2, y = n−2, n−1, ..., n+2$) is also obtained from the second frame memory 19B, similarly.

On the basis of the integration value $Vj_Bxy$ and $Vj_Axy$, deviation $\Delta Vjxy$ related to each monitor point Pjxy is obtained according to the following equation:

$$\Delta Vjxy = |Vj_Axy - Vj_Bxy|, (x=m-2, m-1, ..., m+2, y=n-2, n-1, ..., n+2) \quad (2)$$

Then, a correction of setting of the monitor region Kj is made such that the position of the monitor region is set in a monitor point Pjxy whose deviation $\Delta Vjxy$ becomes maximum and, on the newly set monitor position, the recognition processing in the subsequent cycle is executed.

[3] OBJECT RECOGNITION PROCESSING

Figure 5:
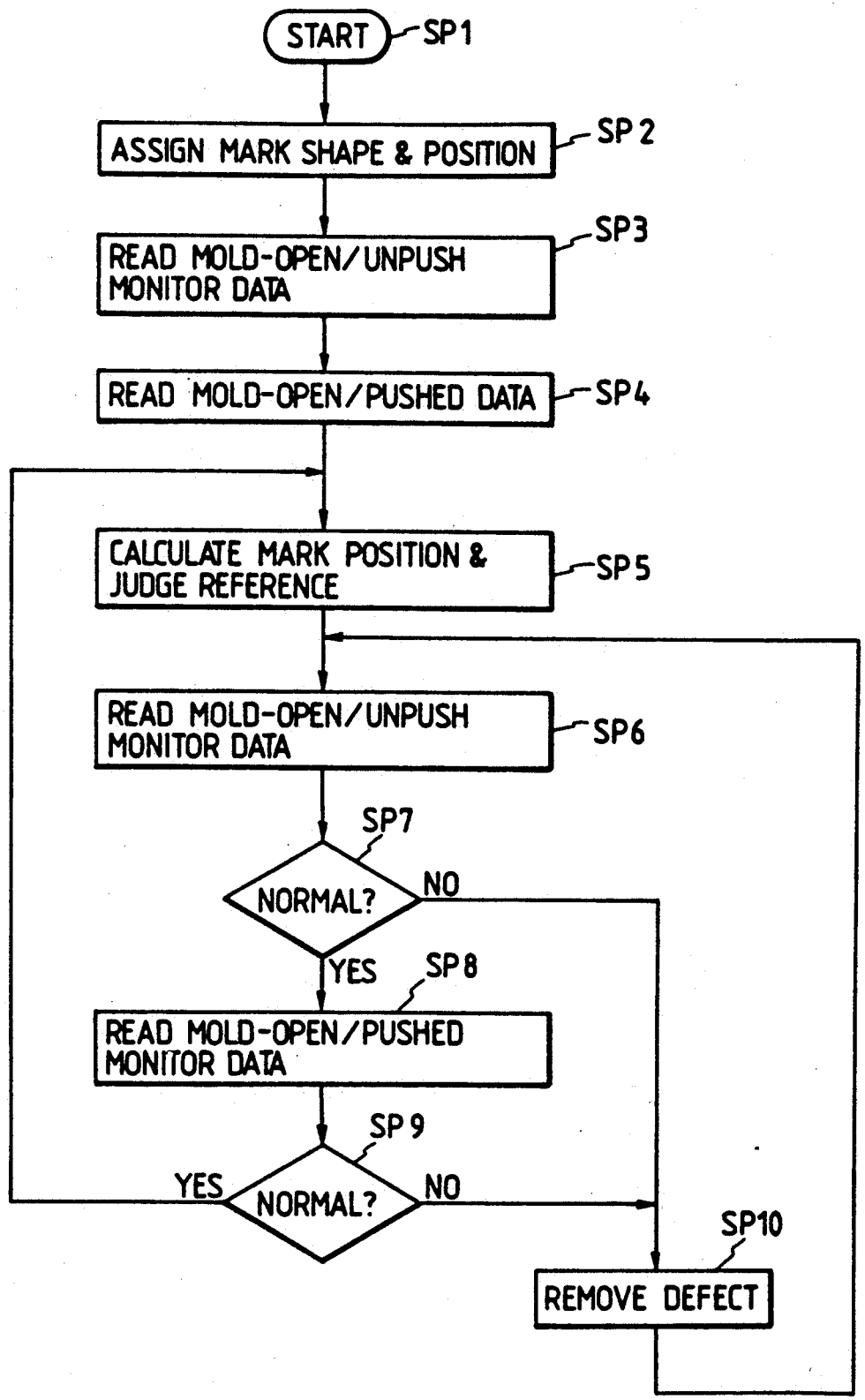
FIG. 5 is a flowchart showing object recognition processing steps performed by a CPU 17 shown in FIG. 1.

The CPU 17 enters into the object recognition processing in step SP1 shown in FIG. 5. Then, in step SP2, the CPU 17 waits for an operator's entry of mark shape instruction data D1 and mark position instruction data D2 through the operation input portion 21. Upon the entry, CPU 17 provides the data D1 and D2 to the mark shape instruction data register REG1 and the mark position instruction data register REG2, respectively.

In this processing, the positions P1, P2, ... to be monitored and the mark shape to be used, according to the monitor region K1, K2, ... (FIG. 3) are selected and instructed for every product molded by the injection mold machine 15.

Then, operation of the CPU 17 is shifted to step SP3 in which first monitor data D5 is stored in mold open-/unpushed monitor data register REG5 (FIG. 5) and, then, to step SP4 in which the second monitor data D6 is stored in the mold open/pushed monitor data register REG6.

In steps SP3 and SP4, CPU 17 stores the first and second monitor data D5 and D6 in the register portion 23 as initial data until a subsequent injection mold cycle becomes ready, while confirming a normal manufacturing operation of a standard molded product, i.e., master product, by testing the injection mold machine 15.

Thus, the initial setting occurs before commencement of the injection mold cycle is completed. Then, the operation of the CPU 17 is shifted to step SP5 to execute recognition processing for determining whether or not a molded product is normally pushed out from the movable mold half when the injection mold machine 15 operates normally through an opening operation of the movable mold half and a pushing-out of the product from the mold half, in synchronism with each mold cycle of the machine 15. In this operation, when the image position is deviated from the monitor region K1, K2, ... set on the display screen PIC, the monitor position P1, P2, ... of the monitor region K1, K2, ... is corrected correspondingly.

That is, in step SP7, the correction of the position of the monitor region is executed according to equation (2).

The CPU 17 operates to obtain, by integrating operations in the monitor data forming portion 35 on the basis of the mark position instruction D2 stored in the mark position instruction data register REG2, luminance data $Vj_A xy$ and $Vj_B xy$ ($x=m-2, m-1,..., m+2, y=n-2, n-1,..., n+2$), when the monitor region Kj is shifted to each of the respective $5\times 5=25$ monitor points Pjxy within the correction range including the mark position Pjmn which is the center of the monitor region Kj (FIG. 4). The luminance data is obtained from the first and second memories 19A and 19B and, on the basis of the luminance data $Vj_A xy$ and $Vj_B xy$ thus obtained, the monitor position Pjxy is obtained whose luminance variation data $\Delta Vjxy$ represented by the equation (2) is maximum.

The mark position set by operation in the step SP2 is set as the monitor position at which the deviation of the luminance data $Vj_A xy$ and $Vj_B xy$ represented by the monitor data D5 and D6 stored in steps SP3 and SP4 (and hence the luminance variation data $\Delta Vjxy$) is maximum. Thus, the of determination whether or not the object to be recognized is being properly monitored can be done stably.

A coincidence of the mark position obtained in the step SP5, that is, the monitor position Pjxy at which the luminance variation data $\Delta Vjxy$ becomes maximum, with the monitor position Pjmn initially set by the operator means that a coincidence of the injection mold operation of the injection machine 15 in a current injection molding cycle with the luminance information of the master set by the operator and, hence, that the CPU 17 has taken in information data, from which a practically accurate recognition result is obtainable.

On the contrary, when the monitor position Pjxy at which the luminance variation data $\Delta Vjxy$ becomes maximum is not coincident on the monitor position Pjmn set by the operator, it means that there is a possibility of deviation of the image in the field of sight FILD of the television camera 16 from the initially set condition.

Even if there is such positional deviation, it can be considered that the image portion of the monitor region initially set by the operator is moved to the monitor position at which the luminance variation data $\Delta Vjxy$ becomes maximum, which means that recognition information can be taken in with preciseness high enough to exclude an erroneous recognition practically.

In addition, the CPU 17 operates, in step SP5, on the reference value data D4 on the basis of the monitor data D5 and the monitor data D6 according to equation (1).

The reference data D4 is in between the signal level of the data D5 and the signal level of the monitor data D6 as shown in FIG. 6 so that the luminance of the monitor region Kj is reduced to that of the movable mold half when a relatively bright molded product attached to the movable mold half is pushed out therefrom by the pushing operation of the injection mold machine 15. That is, by comparing the monitor data D5 with the reference data D4, it is checked if a state where the molded product remains attached to the movable mold half immediately after the latter is opened has occurred. Thereafter, by comparing the monitor data D6 with the reference data D4 to confirm that the luminance of the monitor region Kj at the pushing operation of the machine 15 is changed from the first monitor data D5 to the second monitor data D6, it is possible to confirm that the normal pushing operation of the mold machine 15 is performed.

When the CPU 17 confirms, by a control signal CONT from the control signal input/output circuit portion 27, that the mold of the injection mold machine 15 is opened while the pushing of the product therefrom is not as yet performed, operation is shifted to step SP6 in which the first monitor data D5 is taken from the first frame memory 19A through the monitor data forming portion 35 in the monitor register REG 5 and, then, to step SP7 in which it is checked, by the checking operation mentioned with respect to FIG. 6, whether or not the first monitor data D5 is normal.

If it is normal, the operation of the CPU 17 is shifted to step SP8 at a time when the machine 15 pushes the product from the movable mold half, in which the second monitor data D6 is taken from the second frame memory 19B through the monitor data forming portion 35 in the pushed monitor data register REG6. Operation is then shifted to step SP9 in which it is checked, through the checking on the reference data D4 and the second monitor data D6 as mentioned with respect to FIG. 6, whether or not the second monitor data D6 is normal.

When the check result in step SP9 is affirmative, which means that the operation of the injection mold cycle of the machine 15 is normal, the operation of the CPU 17 is returned to step SP5 to calculate the mark position and the reference value for a subsequent injection mold cycle.

On the contrary, when either of the check results in steps SP7 and SP9 is negative, which means that the injection mold cycle of the machine 15 is abnormal, the operation of the CPU 17 is shifted to step SP10 in which the operation is interrupted until the abnormality is removed by the operator. After the abnormality is removed, the operation of the CPU 17 is returned to step SP6 to take new monitor data D5 and D6 and perform the check again.

The reason why the operation of the CPU 17 does not return to step SP5 but returns to step SP6 is that, since it is impossible to obtain correct monitor data D5 and D6 when abnormality occurs, the monitor position of the monitor region Kj and therefore data D4 are used as they are in the next check.

During the repetitive processing, the operation in step SP5 is performed on the basis of the monitor data D5 and D6 newly taken in steps SP6 and SP8, so that the monitor position of the monitor region Kj and the reference data D4 are updated every injection molding cycle of the machine 15.

With the construction described hereinbefore, in which the monitor region Kj is updated every injection molding cycle with a monitor position at which the monitor data variation between the data obtained at a time when the movable mold half of the machine 15 is opened and before the pushing-out operation of the product from the movable mold half is done and at a time when the product is pushed out becomes maximum, the monitor position of the monitor region Kj is updated even if there is a relative position deviation of the image on the display screen PIC from the preliminarily set monitor region Kj. Therefore, it is possible to always obtain an optimum recognition result of the object without need of troublesome resetting of the monitor region Kj every injection cycle.

[4] THE SECOND EMBODIMENT

Figure 7:
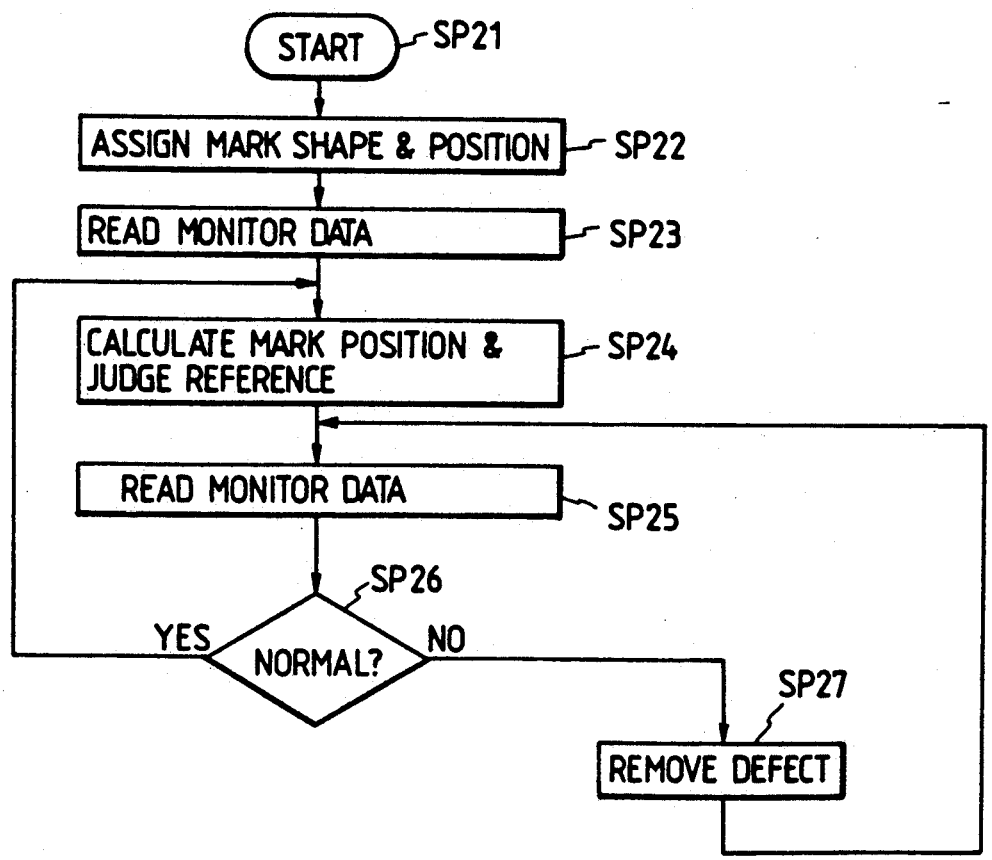
FIG. 7 is a flowchart showing operation of a second embodiment.

FIG. 7 shows a second embodiment of the present invention in which the CPU 17 executes a monitoring of the injection mold machine 15 in the so-called single monitor mode.

Figure 8:
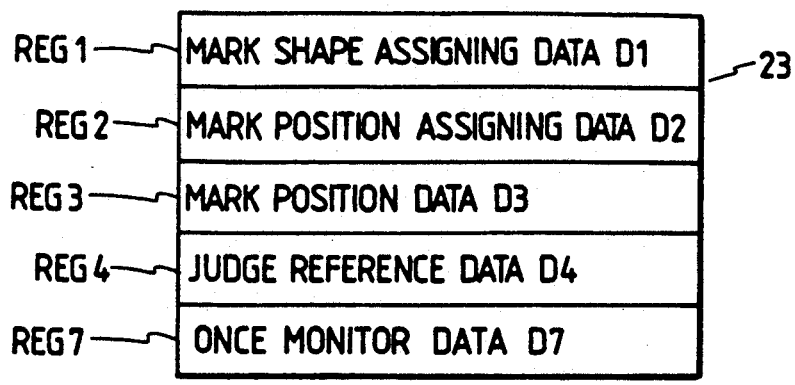
FIG. 8 shows details of a register used in the second embodiment.

This is different in operation from the embodiment shown in FIG. 5 in that, in the latter, the mold open/unpushed monitor data D5 is obtained as the monitor data at the time when the mold of the machine 15 is opened and the pushed monitor data D6 is obtained at the time when the machine 15 performs the pushing out operation, while, in the second embodiment, only data similar to the pushed monitor data D6 is stored in the register portion 23 (FIG. 8) as monitor data D7 which is processed according to a program shown in FIG. 7.

In FIG. 7, the CPU 17 starts to operate in step SP21 and, then, in step SP22, receives data of the mark shape and mark position input by the operator through the operation input portion 21 in a similar manner to that mentioned with respect to step SP2. Thereafter, a test run of the injection mold machine 15 is performed in step SP23. Then, monitor data DWCH of the monitor region Kj (j=1,2,...) is obtained from the monitor data forming portion 35 among video data obtained from the recognition information memory 19 at the timing of the pushing operation of the machine, which is taken in the single monitor data register REG 7 as single monitor data D7.

Thus, the CPU 17 completes the initializing setting and, in step SP24, calculates a mark position and a judge reference value to execute a monitor process for an injection molding cycle of the injection mold machine 15.

The calculation operation of the mark position in step SP 24 is similar to that performed in the first embodiment shown in FIG. 5 in that an integration value Vjxy is used which is obtained by moving the monitor region Kj to sample points contained in the correction range AR defined by x=m−2 to m+2 and y=n−2 to n+2 which is centered at the monitor point Pjmn (FIG. 4) of the monitor region Kj assigned by the operator. However, in this case, either a darkest position or brightest position (in this embodiment, the brightest position) is selected as a concrete monitor position and, so, the selecting method of the monitor position is different from that in the case of the embodiment shown in FIG. 5.

By the selection of the monitor point among the monitor points Pjxy (x=m−2, m−1,...,m+2, y=n−2, n−1,...,n+2) at which the brightest monitor data D7 can be obtained, a different result of operation of the selected monitor point from that assigned by the operator shows that an image on the display screen PIC is deviated. In such case, the CPU 17 can correct the monitor point from the monitor point Pjxy assigned by the operator to the brightest monitor point Pj correspondingly to the positional deviation.

Figure 9:
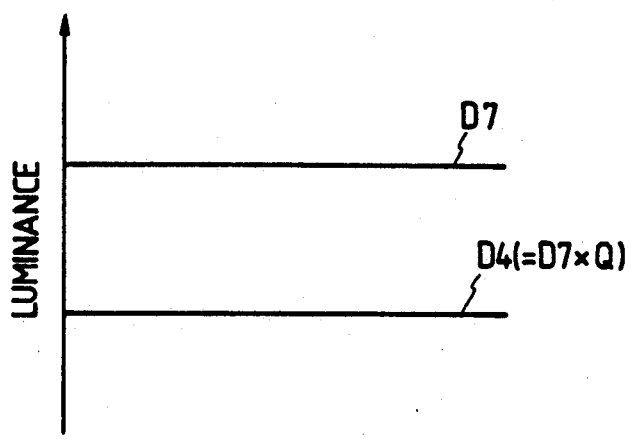
FIG. 9 is an explanatory illustration of a reference of judgement used in the second embodiment.
Figure 10:
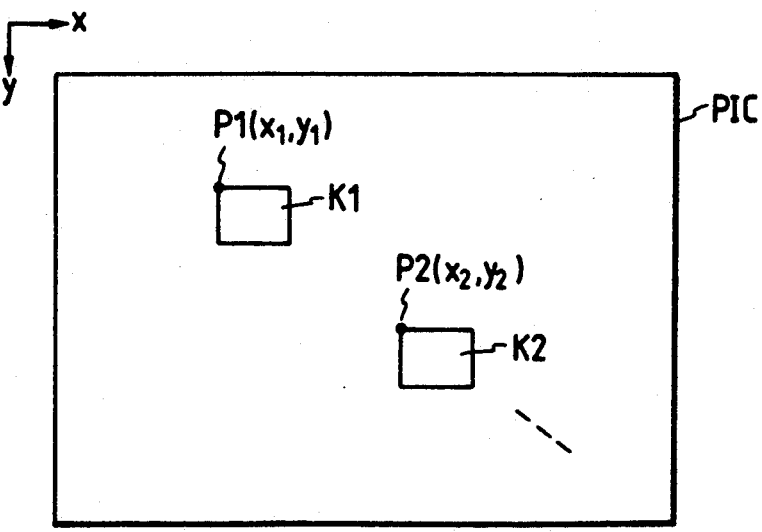
FIGS. 10 to 12 show a conventional construction.
Figure 11:
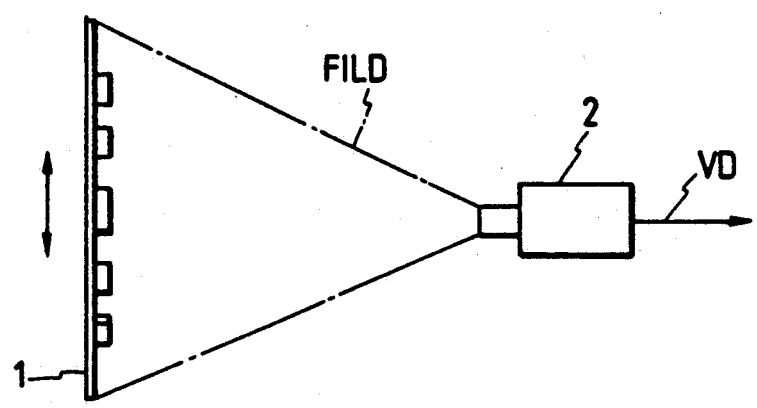

In this embodiment, the judgement reference value data D4 is selected, as shown in FIG. 9, to a signal level lower than monitor data D7 by multiplying monitor data D7 obtained several times in the past with a predetermined coefficient Q, so that, when monitor data D7 obtained from the monitor data forming portion 35 in the respective injection molding cycles becomes lower than the judgement reference value data D4, it is possible to determine an abnormal occurrence in the same injection molding cycle.

In this manner, after a completion of the processing of step SP24, the operation of CPU 17 is shifted to step SP25 in which the monitor data D7 for a current injection molding cycle is taken from the monitor data forming portion 35 into monitor data register REG 7, and, thereafter, the same monitor data D7 is judged on whether or not it is normal, in step SP26.

When a result of judgement in step SP26 is affirmative, CPU 17 returns to the step SP24 to repeat the judging operation for a new injection molding cycle.

On the other hand, when a judging result in step SP26 is negative, the CPU 17 waits, in step SP27, for a removal of such abnormality by the operator and, then, returns to step SP25.

With the construction shown in FIG. 7 in which the CPU 17 updates the monitor point Pjxy at which the judging operation can be performed most stably (that is, the monitor point at which the brightest monitor data D7 in the monitor region Kj can be obtained) for each injection molding cycle in step SP24, it is possible to obtain an object recognition result with practical preciseness even if the image on the display screen PIC is deviated positionally with respect to the preliminarily set monitor region Kj.

[5] OTHER EMBODIMENTS (1) In the above mentioned embodiments, the size of the correction range AR is set to a range of sampling points x=±2, y=±2 with respect to the monitor point Pjmn assigned by the operator. However, when there is an extra operation time given to the CPU 17, it is possible to enlarge the area of the correction range AR.

In such case, it is possible to further enlarge the area of the correction range AR.

Depending upon applications, it is possible to reduce it to a range defined by the sampling points x=±1, y=±1.

In such case, the operation time can be reduced accordingly.

(2) In the above embodiment, the assignment of the mark and the detection position Pjmn of the monitor region Kj is performed manually by the operator through the operation input portion 21. Alternatively, it may be possible that data in an external memory such as an IC card, etc., is read in by the CPU 17.

(3) In the first embodiment, the brightness variation data ΔVjxy (equation (2)) of the monitor data D5 and the monitor data D6 is obtained by integrating the video data DATA at the sampling points included in the monitor region Kj (FIG. 4) and then differentiating them. Alternatively, the same effect can be obtained by differentiating the sampling points and then integrating them.

In such case, as mentioned with respect to FIG. 1, it is possible to obtain, in a similar manner to that of the mentioned embodiment, the brightness variation data ΔVjxy by providing either the frame memory 19A or 19B as the recognition information memory 19, storing the video data DATA at the respective sampling points in the frame memory at a timing of the mold open/unpushed, then differentiating, for each pixel, the stored data with video data DATA input at a timing of the pushed to rewrite the difference data in the same addresses and integrating the difference data corresponding to sampling points contained in the monitor region Kj.

(4) In the above mentioned embodiment, although the object recognition device according to the present invention is applied to the injection mold machine monitoring apparatus, the present invention can also be applied to other machines such as die casting machines, parts machining apparatus, etc., to examine an existence of normality of an object on the basis of a variation of the object provided at the timings before and after one manufacturing step.

(5) In the embodiments shown in FIGS. 5 and 7, the injection mold cycle operation is monitored in either the twice monitor mode or the once monitor mode. The present invention can be applied to a case where both the twice monitor mode and the once monitor mode are used.

(6) In the case of the embodiment in FIG. 4, the monitor data is obtained from the monitor region Kj by obtaining the integration values $Vj_Axy$ and $Vj_Bxy$ for all of the monitor points Pjmn contained in the correction range AR whose size is defined by $x = \pm 2$, $y = \pm 2$ centered at the monitor position Pjmn of the monitor region Kj (that is, $5 \times 5 = 25$ monitor points), operating the deviation ΔVjxy according to the equation (2) and again setting the point having the maximum integration value as the optimum monitor position. Alternatively, in order to reduce the number of monitor points in the correction range AR from which data is taken to determine the optimum monitor position on demand as shown in, for example, FIGS. 13 to 15. In such case, it is possible to not only obtain the same effect as that mentioned previously but also to further reduce the operation time.

Figure 13:
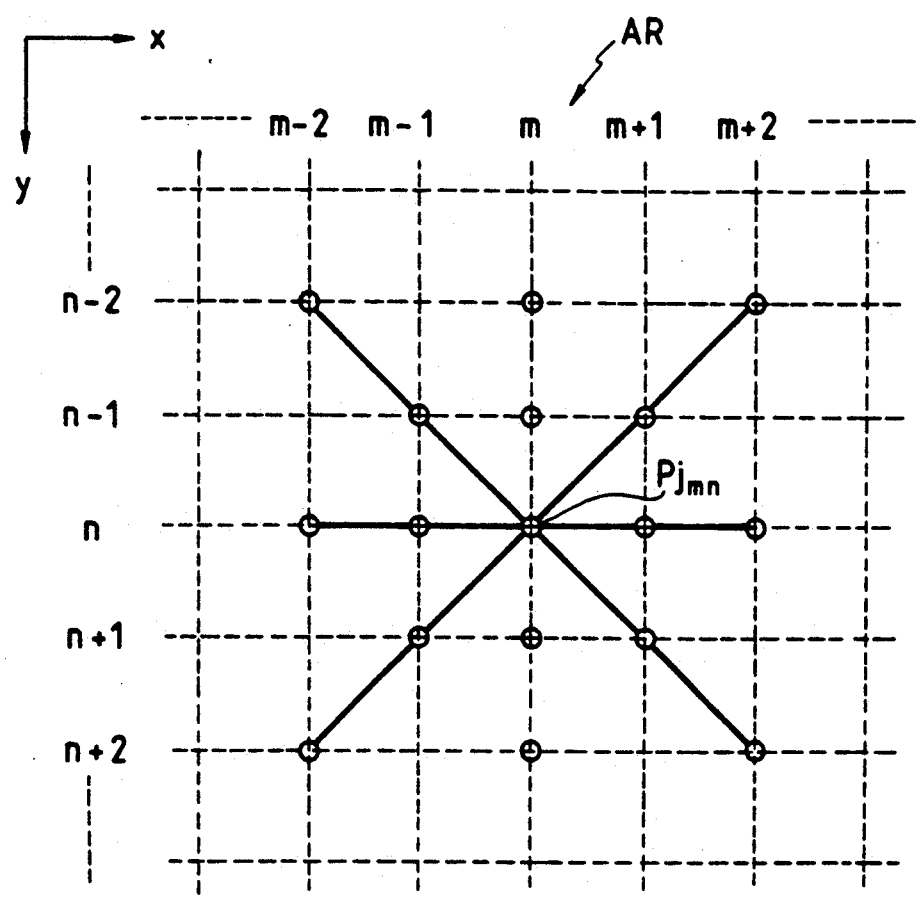
FIGS. 13 to 18 show other embodiments of the correction region AR.

In the case of FIG. 13, a range of $5 \times 5$ sampling points centered at the monitor position Pjmn is set as the correction range AR. When monitor data is taken, as data for judging the optimum monitor position, from the monitor point Pjmn, eight monitor points arranged in the x and y directions passing through the monitor point Pjmn and eight monitor points arranged in oblique directions passing through the monitor point $Pj_{mn}$, the number of data to be taken in can be reduced from $5 \times 5 = 25$ to $1 + 8 + 8 = 17$ while keeping the area of the correction range AR to be taken in as it is. Thus, the operation time for judging the optimum monitor position can be reduced correspondingly.

Figure 14:
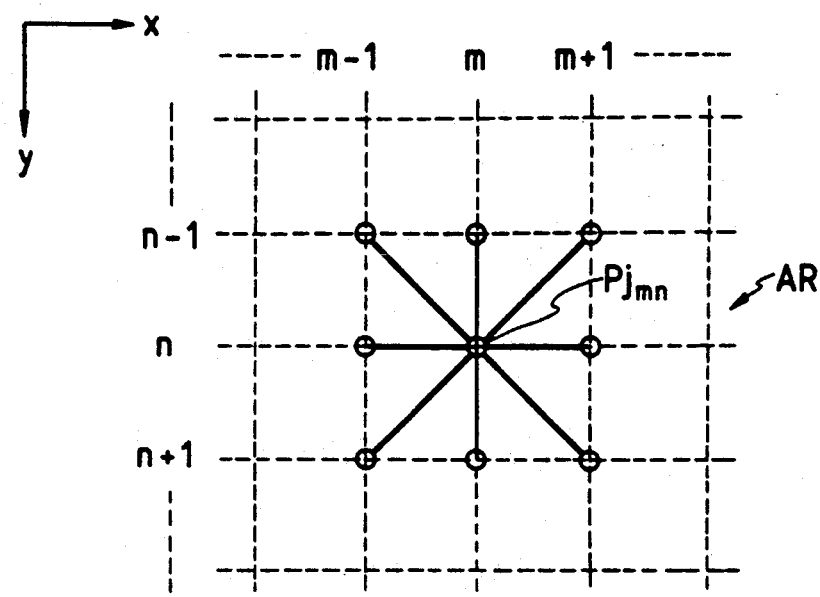

Further, in the case of FIG. 14, the correction range AR is defined in $3 \times 3$ centered at the monitor point Pjmn.

In such case, compared with the case of FIG. 4 in which $5 \times 5 = 25$ monitor points from which data are to be taken in are necessary, it can be reduced to $3 \times 3 = 9$ and thus the operation time can be further reduced.

In a case where measuring conditions of the object to be recognized are stable, the positional deviation of the object with respect to the television camera is practically very small. Therefore, it is possible to correct the setting position of the monitor region with practically acceptable accuracy even when data is taken in from the range centered at the monitor point Pjmn and defined by $x = \pm 1$, $y = \pm 1$.

Figure 15:
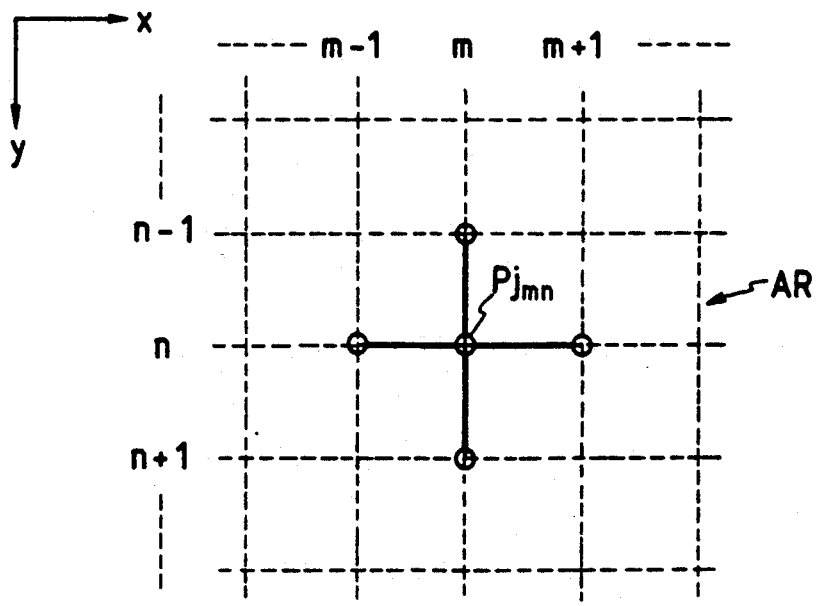

In the case of FIG. 15, compared with the case of FIG. 14, four monitor points centered at the monitor point Pjmn and arranged obliquely are removed from the monitor points from which data are to be taken in. In such case, the operation time can be further reduced.

Figure 16:
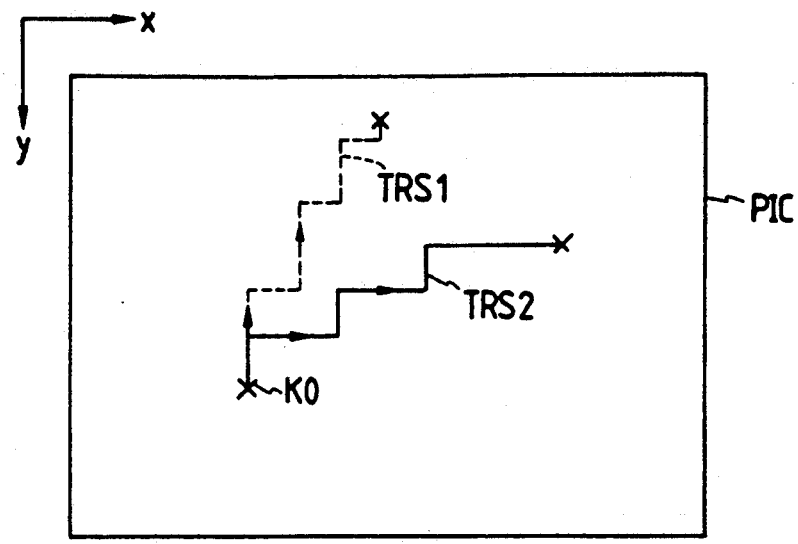

FIG. 16 shows an example of modification in which the monitor position from which data is to be taken is defined in x and y directions and which is applicable to perform a correction in a case where the monitor point KO is moved through a locus TRS1 or TRS2 due to small but continuous deviation of an angle of the television camera. In this case, with only data obtained with respect to the monitor point Pjmn (FIG. 15) in x and y direction, it is possible to perform a positional correction of the monitor region Kj by following the moving monitor point KO with practically acceptable accuracy.

Figure 17:
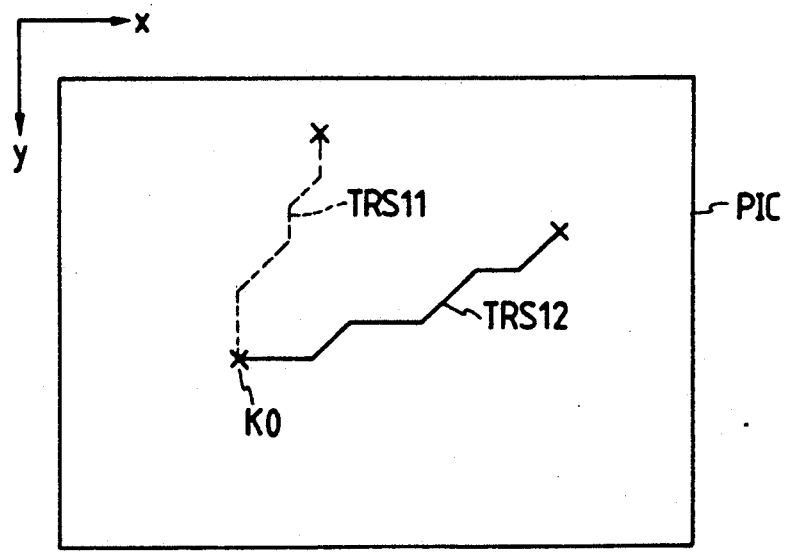

In the case where the angle of the television camera is deviated for a long time as shown in FIG. 16, when data is taken in from monitor points arranged horizontally, vertically and obliquely as shown in FIG. 14, it is possible to follow the moving monitor point KO along a locus TRS11 and TRS12 each including oblique movements as shown in FIG. 17 and thus it is possible to correct the monitor region Kj with higher accuracy.

Figure 18:
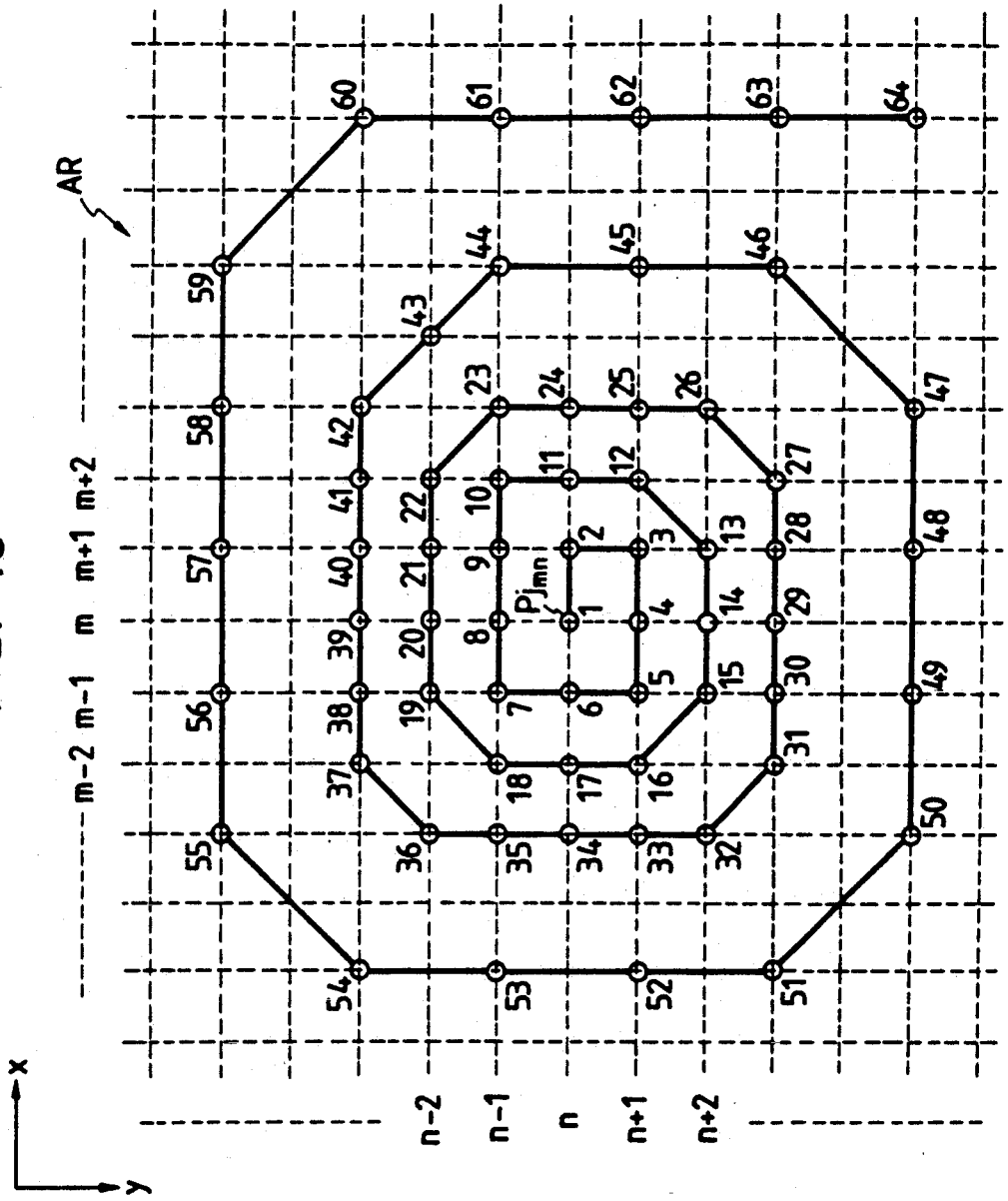

(7) In the case of the embodiment shown in FIG. 4, the correction is made for a large correction range AR containing $5 \times 5$ sampling points. In a case where a correction is necessary for a wider region than this with a relatively small number of data, data is taken in while selecting sampling points on a convolute line starting from the monitor point Pjmn of the monitor region Kj as shown in FIG. 18, so that an optimum monitor point setting is possible for such large area.

In this case in which the monitor point Pjmn of the monitor region Kj is in a center position of a convolute data detection locus and an interval between adjacent sampling points is increased gradually from a small value around the monitor point Pjmn to a large value outside thereof, it is possible to perform a correction of the monitor region Kj with practically effective accuracy corresponding to the enlarged interval of the sampling points arranged in the outside portion of the convolute.

Since the probability of occurrence of the positional deviation of image is large in a periphery of the monitor point Pjmn practically, it is possible to correct the monitor point with high accuracy when the correction is made for sampling points arranged in dense. On the other hand, since the possibility of positional deviation of the image at sampling points remote from the monitor point Pjmn is low, it is possible to correct the positional deviation of the image with practically acceptable accuracy by moving the convolute center of the data detection locus to the large positional deviation position by means of a rough correction and then performing the high density correction.

(8) In the case of the embodiment in FIG. 4, the single correction range AR including 5×5=25 sampling points is provided as correction condition. Alternatively, it is possible to provide a plurality of correction conditions, for example, correction ranges AR and switch between them at a start of each monitoring operation. In such case, a correction operation of monitoring point can be realized with practically acceptable efficiency.

In the case of this embodiment, it is possible to use that having the convolute detection locus mentioned with respect to FIG. 18 as the correction range AR. AS the largest, first correction range a detection locus from first monitor point to 64th monitor point is used so that it is possible to detect correction data for an area corresponding to 13×11 sampling points, a detection locus from the first monitor point to 26th monitor point is used as a second correction range having a middle area so that a correction data for an area corresponding to 6×7 sampling points can be detected and a detection locus from the first monitor point to 9th monitor point as the smallest correction area so that a correction data corresponding to 3×3 sampling points can be detected.

Figure 19:
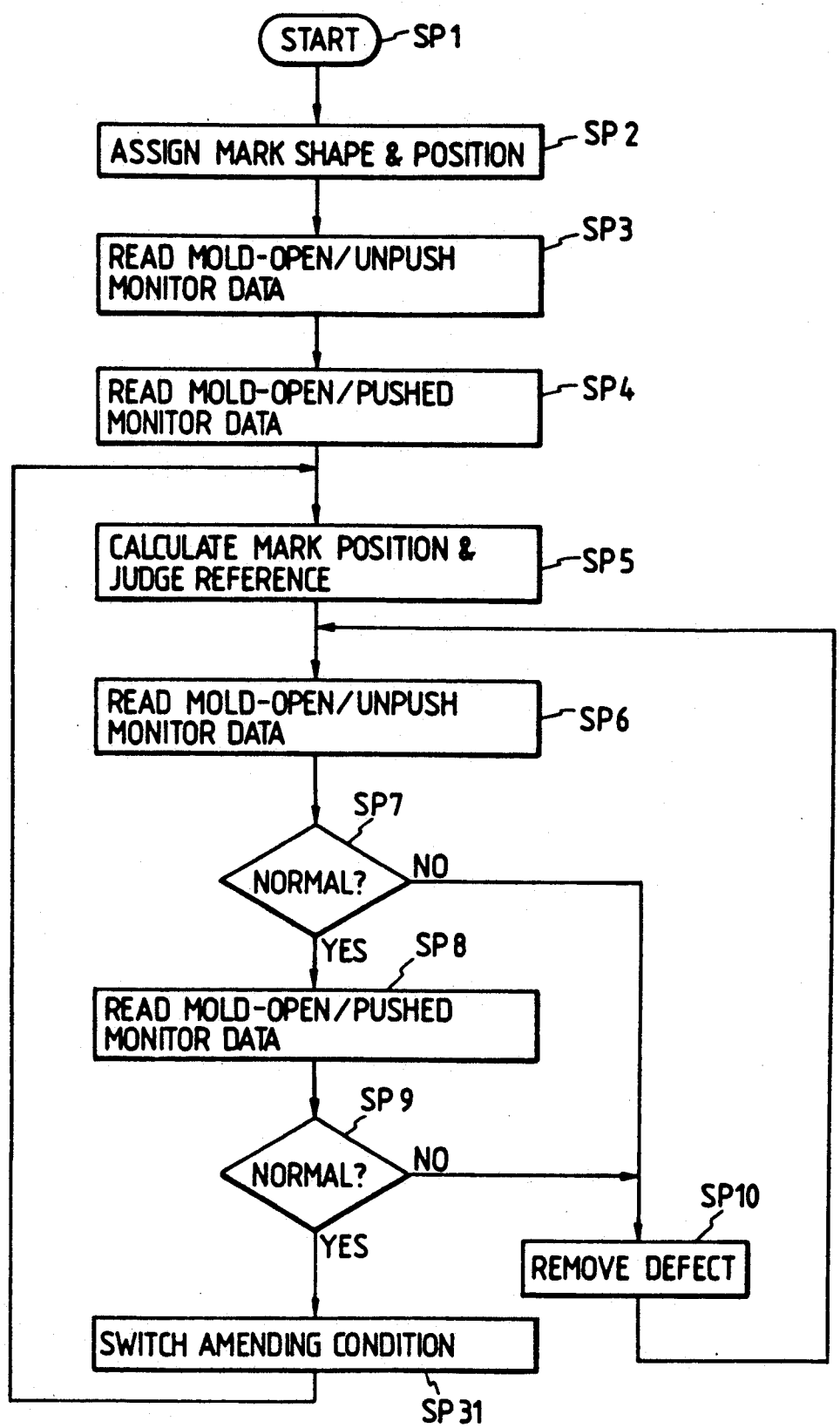
FIGS. 19 and 20 are flowcharts showing processing of objects to be recognized in other embodiments.

As shown in FIG. 19 (or FIG. 20) corresponding portions of which to those shown in FIG. 5 are depicted by the same reference numerals, among these three correction ranges, the CPU 17 uses the largest range to determine the mark position in step SP5 (or SP24) after the operation enters into the injection mold cycle from step SP4 (or SP23) to thereby execute the correction operation for the first injection mold cycle.

When the result in step SP9 (or SP26) is affirmative, the CPU 17 switches, in step SP31 (or SP32), the correction range from the first stage correction range to the second stage correction range at a time when its operation returns to step SP5 (or SP24), so that the CPU 17 executes the correction of the mark position in step SP5 (or SP24) in the second injection mold cycle with the second stage correction range having a middle size.

When the result of operation in step SP9 (or SP26) in the second injection mold cycle is affirmative, the CPU 17 switches the correction range to the narrowest, third stage correction range in step SP31 (or SP32).

As a result, the CPU 17 executed the correction in step SP5 (or SP24) in the third injection mold cycle.

For the subsequent injection mold cycles, the CPU 17 executes the mark position correction for the narrowest correction range selected in step SP31 (or SP32).

By doing so, the initial correction of the monitor range Kj can be done with the relatively large correction range so that the correction for the first injection mold cycle can be done over a large correction range so that it is possible to reliably follow an image deviation even if it is considerably large.

After such correction, by switching the correction range to the narrow, second stage correction range and then to the narrowest, third stage correction range sequentially, it is possible to reduce the operation time for correcting the monitor range Kj to the optimum monitor position correction correspondingly to the reduction of the correction range.

Since the correction is made according to the image position deviation with accuracy which becomes higher every correction, practically, it is possible to effectively avoid a possibility of overrunning from the permissible correction range even if it is the narrowest, third stage correction range for the third injection mold cycle.

In the case of the embodiment shown in FIG. 19 (or FIG. 20), in switching the correction range in step SP31 (or SP32), the third stage correction range is used for the injection mold cycles subsequent to the third injection mold cycle. Alternatively, by providing a plurality of correction ranges having different sizes for the third stage correction range and selecting one of them statistically according to calculation of data obtained in a plurality of corrections made in the past, to select a relatively large correction range when the position of the image is always changed. In such case, it is possible to realize the correction of the monitor range within the shortest time for a given image position deviation.

If there is substantially no image position deviation in the injection mold cycles in the past, the image position deviation can be corrected practically even if the correction range selected has a size covering adjacent ranges (that is, $x=\pm 1$, $y=\pm 1$). Therefore, the correction operation can be done within a very short time. On the contrary, when the image always deviates within an area covering sampling points, for example, $x=\pm 2$, $y=\pm 2$ it is impossible to correct without setting the correction range as large as at least $x=\pm 3$ or $\pm 4$, $y=\pm 3$ or $\pm 4$.

When, in this embodiment in which the image always deviates, a large correction range is selected according to the result of several correction operations in the past, the monitor position can be corrected reliably according to the variations of the image.

(10) In the case shown in FIG. 19 (or FIG. 20), in switching the correction condition in step SP31 (or SP32), the monitor cycle is set in a predetermined, fixed time period by performing the correction once every injection cycle. Alternatively, it is possible to improve the efficiency of correction operation by switching correction operation timing.

That is, immediately after the start of monitor operation, the image position deviation is corrected reliably by correcting it every monitor cycle even if there is unstable image position deviation. After the operation enters into a stable state in which there is a little image position deviation, the monitor cycle period for correction operation is enlarged when there is a little necessity of correction under the frequency of correction in the past.

By doing so, according to the state requiring correction, the correction operation timing is controlled, resulting in efficient correction operation of the monitor region.

(11) In the embodiments mentioned hereinbefore, when the size of the correction range as the correction condition is switched to switch the correction condition in step SP31 in FIG. 19 (or step SP32 in FIG. 20), the correction range is enlarged correspondingly to the instability of image position deviation or the correction timing is controlled after the start of the monitor operation. Alternatively, these conditions may be combined on demand.

For example, when the machine to be monitored is in a stable operation condition, the correction range is made small and correction timing is made longer, while, when the machine is unstable, the correction range is made large and timing period is made short.

By doing so, it is possible to switch the correction condition according to the operation condition of the machine to be monitored and, thus, an object recognition device capable of correcting image position deviation with higher accuracy can be realized easily.

Figure 20:
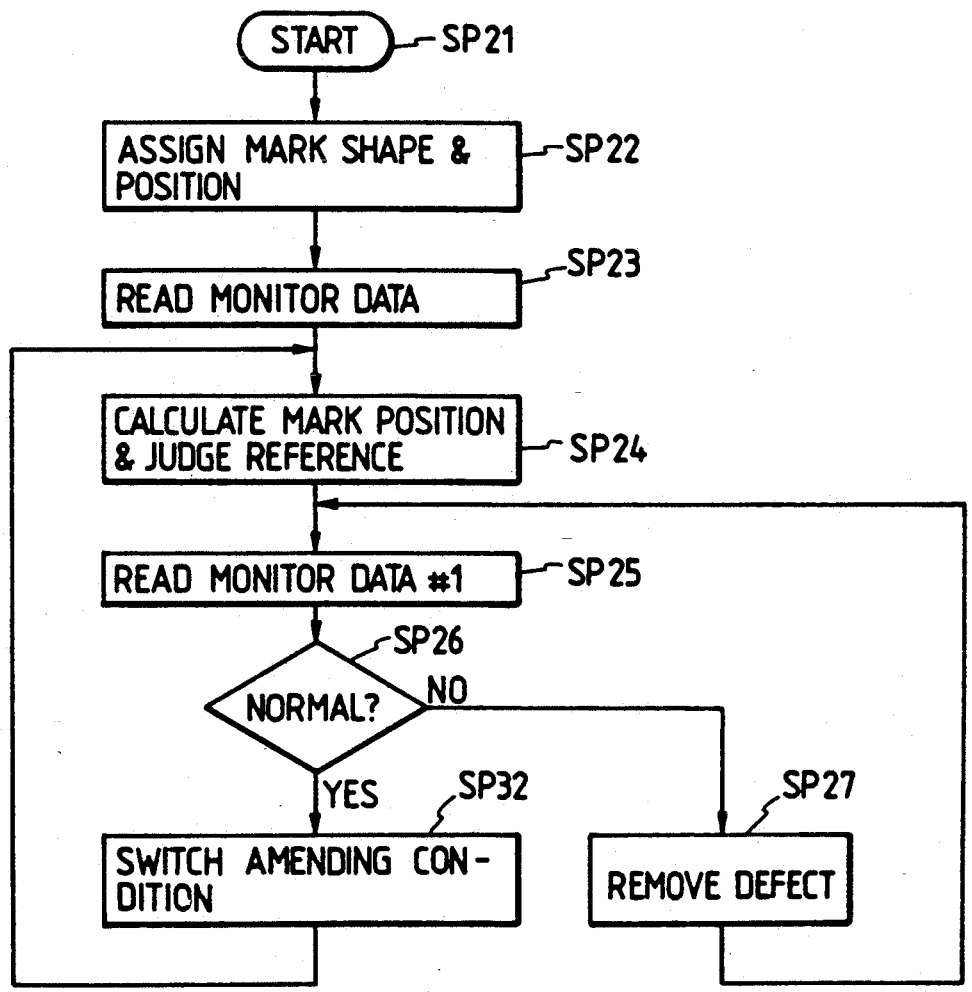

(12) In the object recognition procedures shown in FIGS. 7, 19 and 20, the monitor region Kj can be corrected efficiently while effectively utilizing the injection mold cycle time of the injection mold machine to be monitored, by performing the positional correction of the monitor region Kj prior to the monitor operations in steps SP6-SP9 or SP25 and SP26 by executing the mark position operation in step SP5 or SP24.

A time portion of one injection mold cycle time in a case of an injection mold machine, for which the mold is opened and the monitor operation of steps SP6-SP9 or SP25 and SP26 are to be performed, is extraordinarily short (for example, in a case of a plastic mold machine, in the order of 2 seconds), while a time portion for which the mold is closed and an injection step and a cooling step are performed is extremely long (for example, in the case of a plastic mold machine, in the order of 15 seconds) and it is impossible to perform the monitor operation in the latter time portion.

On the contrary, the operation time of the mark position in step SP5 or SP24 may be considerable depending upon the size of the monitor region Kj.

In this embodiment, the correction operation is performed during the mold closed time of the injection mold machine by taking these conditions into consideration and the monitor operation of the next injection cycle is made for the monitor position Kj determined by these operations.

Since, by doing so, there is no need of providing an idle time of the injection mold machine operation for which the monitor data is produced in the machine step of the injection mold machine, it is possible to run the injection mold machine efficiently as a whole correspondingly thereto.

(13) In the mark position operation procedure of steps SP5 and SP24 in the object recognition procedure shown in FIGS. 5 and 7 and 9 and 20, in correcting the monitor position of the monitor region Kj, the correction range AR is set slightly larger and a warning may be produced by providing a judgement of impossibility of monitor when the position of the monitor region Kj after corrected exceeds a limit correction range set in the larger correction range or the operation of the machine to be monitored may be stopped.

Such condition of monitor impossibility means that the machine to be monitored is out of detection condition preliminarily set by the object recognition device and becomes abnormal. By the detectability of such abnormal condition, it is possible to improve the function of the object recognition device correspondingly.

(14) In the mentioned embodiments, the monitor region Kj (j=1, 2,...) is displayed on the display screen PIC (FIG. 3) while the correction range AR (FIG. 4) is not displayed on the screen PIC. Alternatively, it is possible to display a position at which the monitor region Kj can be corrected on the display screen.

Figure 21A:
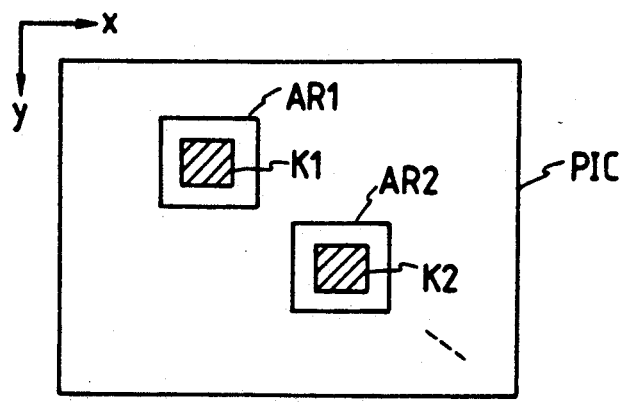
FIGS. 21A, 21B and 21C, is an explanatory illustration of the display of the correction range AR on a display PIC.
Figure 21B:
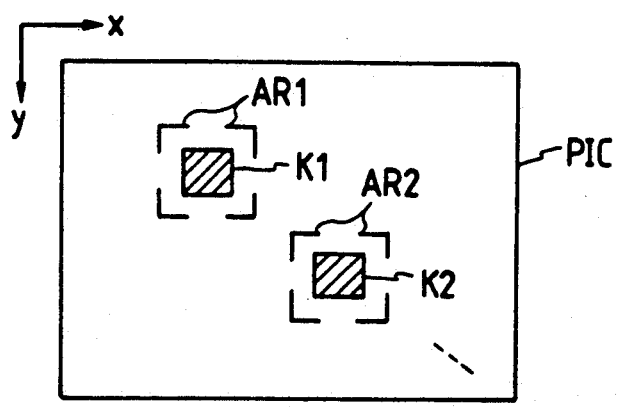
Figure 21C:
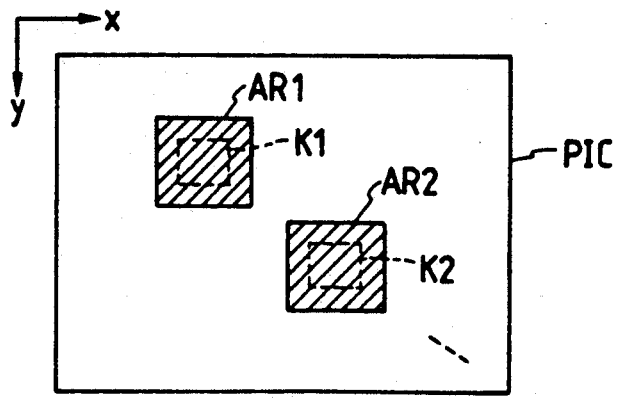

That is, as shown in FIG. 21, a frame defined by four straight lines which represents the correction range ARj (j=1,2 ...) surrounding the monitor region Kj (j=1, 2, ...) is displayed on the display screen (FIG. 21A) or the frame may be represented by four reverse-L shaped corner marks (FIG. 21B) or the correction range ARj including the monitor region Kj is darkened (FIG. 21C).

The display in FIG. 21 can be thought as suitable for the case (FIG. 4) where the monitor region Kj (j=1, 2, ...) can be corrected for all pixels contained in the correction range AR.

On the contrary, in a case where the correction is possible for the monitor region Kj (j=1, 2, ...) whose monitor points are limited to sampling points within the correction range AR as shown in FIGS. 13, 14, 15, 16, 17 and 18, the monitor points at which the correction is possible are displayed by darkening them, etc.

By doing so, the operator can see, for respective monitor regions Kj, a range in which the correction is possible when the image deviates, so that it is possible to confirm the correction operation being performed by the monitor device for actual deviation of the image, resulting in an improvement of reliability of the object recognition device.

(15) In the embodiment shown in FIG. 15, a detection locus along which the monitor point is shifted while selecting a different one of the monitor points contained in a correction range in a predetermined sequence around the predetermined monitor point and the processing for obtaining luminance information of the respective monitor points along the locus is performed. When the detection locus has an outwardly expanding convolute pattern starting at the predetermined monitor point as shown, a plurality of correction ranges including the predetermined monitor point as a common starting monitor point are provided by grouping the monitor points on the locus. By selecting one of the ranges, the processing for obtaining luminance information of the selected correction range is performed. Thus, a correction can be performed for the correction range having a variable area.

(16) In the embodiments mentioned hereinbefore, as the conditions for determining the monitor position of the monitor region Kj or the correction position at which the positional deviation of the image is corrected, the position is determined such that the difference in luminance thereof between the state prior to pushing and the state after pushing becomes maximum as described with reference to equation (2). In addition thereto, it is possible to reset the monitor region Kj on the basis of luminance variation of points in the vicinity of monitor points having similar luminance deviation to that of the monitor position having the maximum deviation.

That is, in the case where the monitor point having the maximum luminance deviation is determined as the correction position, there may be a case, depending upon an image of the object to be monitored, where the luminance of the monitor point having the maximum deviation is not uniform and varies considerably with respect to a change of the monitor point and so there may be a case where the correction point becomes improperly dependent upon the content of the item to be monitored.

Figure 22A:
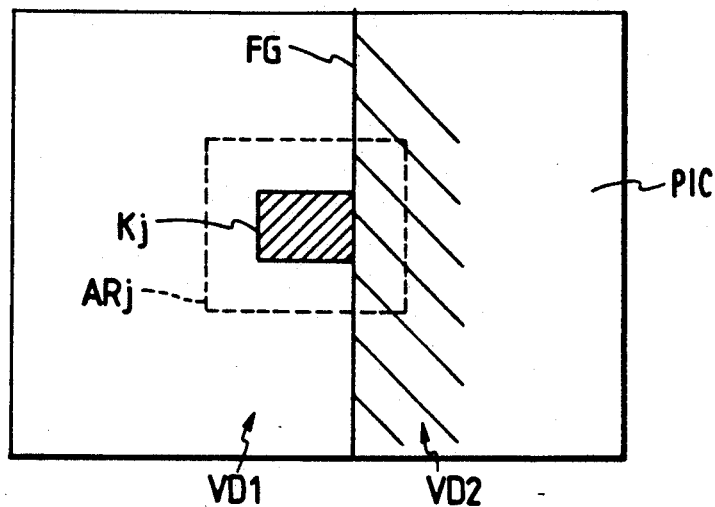
FIGS. 22A and 22B, is an explanatory illustration of a case where brightness of an area around an optimum monitor point is varied.

For example, as shown in FIG. 22A, in a case where a bright portion VD1 of an image for which the monitor region Kj is to be set and a dark portion VD2 thereof are disposed adjacent on both sides of a border line FG and a position contacting with the border line FG is selected as the monitor region Kj after correction, the correction range ARj containing the monitor region Kj spreads beyond the border line FG into the dark portion VD2. Since it is not possible to set the monitor region Kj as the monitor point after correction in a position covering the border line FG, there is produced a state in which a slight deviation of the camera angle causes an extremely different judgment result to be produced, that is, it becomes an unstable judgment condition.

In such a judgment state, where a current image is slightly deviated with respect to the monitor region set in the preceding injection mold cycle, there may be a case where a judgement of occurrence of a luminance deviation exceeding the judgement reference value is not possible even if an injection mold product is normally pushed out practically. (In other words, the products are always judged as not being pushed out normally.)

Figure 22B:
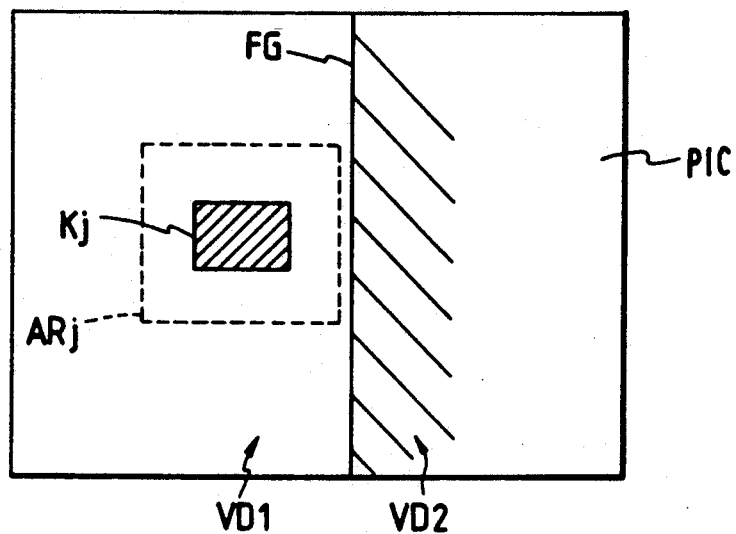

As shown in FIG. 22B, in a case where the monitor point is assigned in the vicinity of the border line FG as is the case shown in FIG. 22A while the correction range ARj of the monitor region Kj does not cover the border line FG, there is no case where the monitor region Kj is set in a position across the border line FG. Since there is no variation of luminance deviation at the monitor point, which is corrected in the preceding injection cycle, between the states prior to and after the pushing-out, it is possible to obtain a stable judgment result in which, in setting the correction position, it is possible to always assign the same position.

Therefore, in this embodiment, a variation of luminance occurred in the monitor region Kj when the latter is initially set or it is corrected to an optimum monitor position is operated and a group of monitor points having similar luminance to the maximum luminance of a monitor point is selected with the latter point being a reference. One of the monitor points in the group is selected as the point to be set by using a variation of luminance of a surrounding portion thereof.

By doing so, in a case where the measuring condition is based on a situation where there is a portion of an image in which there is always a sampling point in the vicinity of a monitor point to be set whose luminance varies considerably as in the case of a monitoring of, for example, a short mold, a monitor point is selected from the monitor points whose luminance is maximum and other monitor points which have similar luminance to that of the former, which exhibits the largest variation of luminance as the newest monitor point. Thus, it is possible to select the optimum monitor point for monitoring the short mold, etc.

As to other monitor points than this, it is possible to set optimum monitor positions which are made stable by selecting them as monitor positions whose luminance becomes maximum stably on the basis of a judgement that luminance variation in the vicinity of a monitor point whose luminance is maximum is not large.

(17) Although, in the above mentioned embodiment, the sampling point among sampling points contained in the monitor region Kj which is positioned at an upper left side corner of the monitor region Kj is used as the monitor point of the monitor region Kj as mentioned with respect to FIG. 4, any of the other sampling points can be used so long as it is contained in the monitor region Kj.

(18) In the embodiment shown in FIG. 1, after the video data DATA is stored in the recognition information memory 19 composed of the frame memories 19A and 19B by analog-digital converting the video signal VD in the video data input circuit 18, the video data corresponding to the monitor region Kj is integrated. Alternatively, it is possible to obtain a similar result to that mentioned above by analog-digital converting the video signal VD after it is integrated by an analog integration system.

(19) In the described case, a monochromatic camera which produces the video signal corresponding to luminance variation is used as the television camera 16. Alternatively, a color camera can be used with similar result to that in the described case.

When such a color camera is used, three color signals R, G and B are mixed according to the following equation to obtain the luminance signal Y:

$$Y = 0.30R + 0.59G + 0.11B \tag{3}$$

and then it is processed in the same manner as in the case shown in FIG. 1.

As another example, only one of the three color signals R, G and B, for example, the color signal G, can be used to produce the data to be used for the judgement.

Further, it is possible to perform the judgement processing on the basis of a deviation signal S obtained from three color signals R, G and B according to the following equation:

$$S = |R1 - R2| + |G1 - G2| + |B1 - B2| \tag{4}$$

Further, it is possible to perform the judgement on the basis of differences of only two color signals in equation (4).

(20) In the described embodiment, the monitor position whose deviation obtained according to equation (2) is maximum is used as the optimum monitor point. Since such monitor point varies practically due to vibration and/or positional deviation of the television camera 16 and/or the injection mold product to be monitored, it is possible to set a monitor position represented as a mean value calculated from data of the optimum monitor points obtained in several injection mold cycles in the past as the corrected monitor position.

When such mean value of the optimum monitor positions is obtained, the monitor position represented by the mean value corresponds to a center of gravity of spread measured monitor positions.

As mentioned hereinbefore, according to the present invention in which the monitor position of the monitor region is corrected on the basis of the video signal obtained from the recognition object, the object recognition device is capable of recognizing the object under optimum conditions even if an image on the display screen is deviated positionally and can be realized easily.

What is claimed is:

1. An object recognition device for judging whether or not an object to be recognized is normal comprising:
   means for superimposing a monitor region including a plurality of monitor points and being represented by one of said monitor points, on an image produced by video signals obtained from the object;
   means for setting a correction range at and around said one of said monitor points;
   means for monitoring a variation of luminance information obtained from the monitor points contained in said correction range with respect to reference information; and
   means for updating setting of the monitor region when positional deviation of said object occurs to be represented by one of a plurality of monitor points contained in said correction range based on said variations of luminance information of said monitor points contained in said correction range, on which the judgment of normality is facilitated.

2. The device as claimed in claim 1, wherein said monitor point having said luminance information on which the judgement of normality is facilitated is determined according to an amount of variation of luminance of an area around a first monitor point whose luminance variation is maximum and a second monitor point having substantially the same luminance as that of the first monitor point.

3. The device as claimed in claim 1, wherein said updating means updates said monitor region based on a detection locus along which said one of said plurality of monitor points is shifted while selecting a different one of said monitor points contained in said correction range in a predetermined sequence around said shifted monitor point and obtaining luminance information of said respective monitor points along said locus.

4. The device as claimed in claim 3, wherein said detection locus has an outwardly expanding convoluted pattern starting at said one of said plurality of monitor points.

5. The device as claimed in claim 4, further comprising means for providing a plurality of correction ranges including said shifted monitor points as common starting monitor points by grouping said shifted monitor points on said locus and for obtaining luminance information of selected one of said plurality of correction ranges so that an area of said correction range is variable.

6. The device as claimed in any of claims 1 to 4, wherein an area of said correction range is variable.

7. The device claimed in any of claims 1 to 5, wherein said setting of said monitor region is manually performed.

8. The device claimed in any of claims 1 to 5, wherein said setting of said monitor region is performed according to data supplied from an external memory.

9. The device as claimed in any of claims 1 to 5, wherein said monitor region has a variable shape.

10. The device as claimed in claim 1, wherein said object is a product molded by an injection mold machine.

11. The device as claimed in claim 10, wherein said variation of luminance information corresponds to a variation in luminance information between reference information and information obtained after said mold machine is opened but before said product is pushed out of said mold machine and information obtained after said product is pushed out of said mold machine.

12. The device as claimed in claim 1, wherein said object is a printed circuit board.

13. The device as claimed in claim 1, wherein said updating means updates said representing one of said monitor points to a monitor point having a corresponding variation of luminance which is a maximum value.

* * * * *